United States Patent [19]

Uchiyama

[11] Patent Number: 5,419,187
[45] Date of Patent: May 30, 1995

[54] AIR FLOW RATE METER AND DETECTION METHOD

[75] Inventor: Kaoru Uchiyama, Oomiya, Japan

[73] Assignee: Hitachi, Ltd., Japan

[21] Appl. No.: 122,294

[22] Filed: Sep. 17, 1993

[30] Foreign Application Priority Data

Sep. 17, 1992 [JP] Japan .................. 4-247554

[51] Int. Cl.[6] .......................... G01P 5/10; G01M 19/00
[52] U.S. Cl. ................................ 73/118.2; 73/204.18
[58] Field of Search ............ 73/118.2, 861.01, 204.18, 73/204.19; 364/431.12

[56] References Cited

U.S. PATENT DOCUMENTS

| Re. 31,906 | 6/1985 | Oyama et al. ............... 73/204.18 |
| 4,737,914 | 4/1988 | Abe et al. .................. 364/431.12 |
| 4,884,215 | 11/1989 | Zboralski et al. ............ 73/118.2 |
| 5,086,745 | 2/1992 | Nishimura et al. ........... 73/118.2 |
| 5,092,164 | 3/1992 | Matsuoka et al. ............ 73/118.2 |
| 5,207,094 | 5/1993 | Gmelin et al. .............. 73/118.2 |

FOREIGN PATENT DOCUMENTS

| 0103212 | 3/1984 | European Pat. Off. ......... 73/118.2 |
| 3931308 | 3/1991 | Germany .................... 73/118.2 |
| 1-274016 | 1/1989 | Japan . |

Primary Examiner—Herbert Goldstein
Assistant Examiner—James M. Olsen
Attorney, Agent, or Firm—Evenson, McKeown, Edwards & Lenahan

[57] ABSTRACT

An air flow rate meter for detecting an air flow rate in a wide operating temperature range. A heating temperature of a heat generating resistor for detecting an intake air flow rate is set on the basis of an intake air temperature or a current flowing through the heat generating resistor. The heating temperature of the heat generating resistor is kept at an optimum value determined from a look up table stored in a read only memory.

31 Claims, 8 Drawing Sheets

FIG. 11

TABLE 1  ROM DATA     Tht (°C)

| TEMP (°C) | ZONE (A) Ih = ~94mA | NEUTRAL ZONE (E) Ih = 94~96mA | ZONE (B) Ih = 96~105mA | NEUTRAL ZONE (F) Ih = 105~107mA | ZONE (C) Ih = 107~124mA | NEUTRAL ZONE (G) Ih = 124~126mA | ZONE (D) Ih = 126mA~ |
|---|---|---|---|---|---|---|---|
| -40~-30 | 158.4 | — | 157.4 | — | 155.3 | — | 152.1 |
| -30~-20 | 169.6 | — | 168.7 | — | 166.9 | — | 164.1 |
| -20~-10 | 180.7 | — | 180.0 | — | 178.5 | — | 176.2 |
| -10~0 | 191.8 | — | 191.2 | — | 190.0 | — | 188.2 |
| 0~10 | 203.0 | — | 205.6 | — | 201.7 | — | 200.3 |
| 10~20 | 213.8 | — | 213.7 | — | 213.4 | — | 212.9 |
| 20~30 | 225.0 | — | 225.0 | — | 225.0 | — | 225.0 |
| 30~40 | 236.1 | — | 236.3 | — | 236.6 | — | 237.0 |
| 40~50 | 247.2 | — | 247.6 | — | 248.1 | — | 249.1 |
| 50~60 | 258.4 | — | 258.9 | — | 259.8 | — | 261.1 |
| 60~70 | 269.5 | — | 270.1 | — | 271.3 | — | 273.1 |
| 70~80 | 280.7 | — | 281.5 | — | 282.9 | — | 285.7 |
| 80~90 | 291.8 | — | 292.7 | — | 294.5 | — | 297.2 |
| 90~100 | 303.4 | — | 304.4 | — | 306.5 | — | 309.8 |
| 100~110 | 314.1 | — | 315.3 | — | 317.7 | — | 321.3 |
| 110~120 | 325.3 | — | 326.6 | — | 329.3 | — | 333.4 |

AIR FLOW RATE METER AND DETECTION METHOD

BACKGROUND OF THE INVENTION

The present invention relates to an air flow rate meter, and more particularly a thermal air flow rate meter for use in controlling an automobile engine.

The task of decreasing harmful exhaust gas emissions from automobile engines is extremely important, to protect the natural environment and save resources. For this purpose, it is indispensable to control the fuel supply and ignition timing of the engine precisely. To accomplish this, information concerning the flow rate at which air is sucked into the engine is essential. Thus, the demand for a thermal air flow rate meter capable of directly and accurately measuring an air flow rate has increased. For an automobile in particular, a highly precise air flow rate determination must be made in its operating environment, including a temperature range which may vary by as much as −40° C. to 120° C.

In order to maintain a highly precise air flow rate measurement in such an environment, the ambient air temperature must be compensated accurately. For example, Japanese Laid-Open Patent 1-274016 uses a microcomputer to control a heating temperature of a heat generating resistor for this purpose. However, since this system provides a voltage output in the form of a pulse signal, which is not compatible with current applications systems, the hardware must be changed.

Also, with prior art devices, it is difficult to detect the air flow rate with high accuracy over a wide temperature range because the temperature is controlled by intermittently heating the air.

It is therefore an object of the present invention to provide an air flow rate meter and air flow rate detection method capable of detecting an air flow rate in a wide temperature range.

SUMMARY OF THE INVENTION

The foregoing object is accomplished by the air flow rate meter according to the invention, which has a heat generating resistor for detecting an air suction rate, and an air temperature detecting resistor for measuring intake air temperature. The air suction rate is determined from the magnitude of the current that is necessary to heat the heat generating resistor to a temperature which is determined based on the intake air temperature detected by the air temperature detecting resistor. (The temperature of the heat generating resistor in this case is determined from the ratio of the voltage across it and the current flowing through it, which are detected as described below.) A control device for heating the heat generating resistor has a memory with optimum heating temperatures of the heat generating resistor stored therein.

In the air flow rate detection method according to the invention, a heating current for heating a heat generating resistor placed in an air flow is measured, together with the temperature of the intake air. An optimum heating temperature of the heat generating resistor is then determined on the basis of the measured air temperature and heating current. An air flow rate is determined from the heating current required to heat the heat generating resistor to the optimum heating temperature.

The heat generating resistor dissipates heat by conduction through a supporting member of the heat generating resistor itself, and by heat transfer to air. The heat conduction and the heat transfer process are each affected by changes in the air temperature. Thus, the rate of heat transfer varies with the air flow rate. The heat conduction variation with temperature is compensated as a function of both the air temperature and the air flow rate. In this manner, a decrease of detection accuracy due to a change of the air temperature can be avoided. For the purpose of compensation with the air flow rate, compensation neutral zones are provided to prevent erroneous operation due to the temperature compensation.

Other objects, advantages and novel features of the present invention will become apparent from the following detailed description of the invention when considered in conjunction with the accompanying drawings.

BRIEF DESCRIPTION OF THE DRAWINGS

FIG. 11 shows a look up table of target temperature values.

DETAILED DESCRIPTION OF THE DRAWINGS

Figure 1:
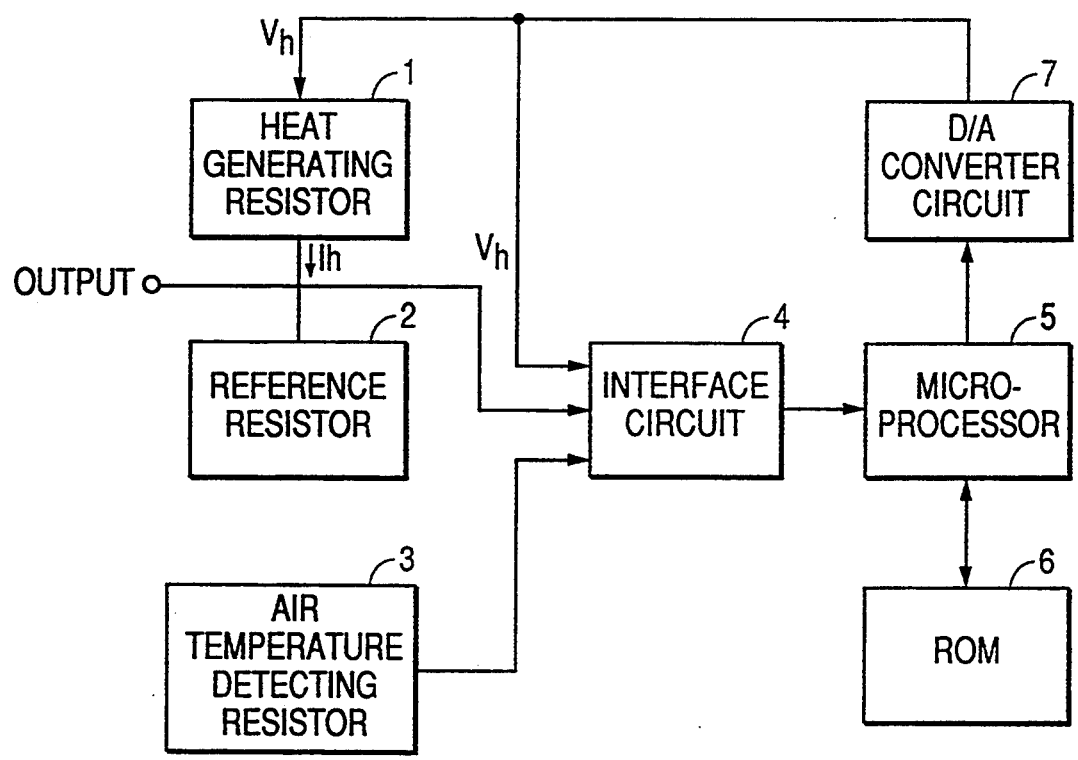
FIG. 1 is a block diagram of an air flow rate meter of the present invention.

FIG. 1 shows a heat generating resistor 1, reference resistor 2 for detecting a heating current Ih of the heat generating resistor 1, and an air temperature detecting resistor 3 for detecting air temperature. (The air temperature detecting resistor is located sufficiently far from the heat generating resistor that the air temperature which it senses is not affected by heat from the heat generating resistor.) An interface circuit 4 receives the above-mentioned heating current Ih, a terminal voltage Vh of the heat generating resistor 1, and a signal output of the air temperature detecting resistor 3, and transfers this information to a microprocessor 5. An optimum heating temperature corresponding to the air temperature and heating current Ih (air flow rate signal) is stored in a read only memory (ROM) 6 (FIG. 11, for example), and a digital to analog converter circuit 7 is provided to convert the digital output signal from the microprocessor 5 to an analog signal.

Figure 2:
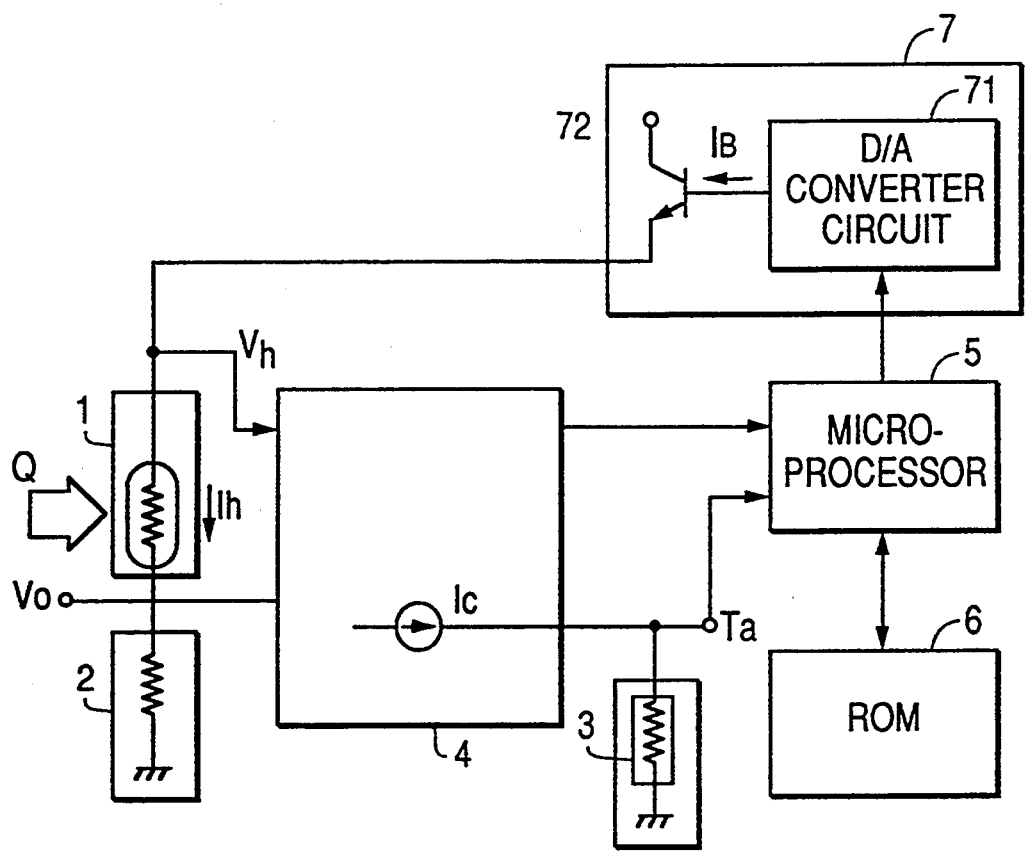
FIG. 2 is a more detailed block diagram of the air flow rate meter according to the invention.

As shown in greater detail in FIG. 2, the air temperature detecting resistor 3 has a regulated current Ic fed thereto from the interface circuit 4. An air temperature signal Ta across the air temperature detecting resistor 3 is provided to the microprocessor 5. The digital to analog converter circuit 7 includes a digital to analog converter 71 and an amplifying transistor 72.

The operation of the air flow rate detector of FIGS. 1 and 2 is as follows. The microprocessor 5 receives the output signal of the air temperature detecting resistor 3 and the heating current Ih (in fact, an air flow rate output signal $V_0$) of the heat generating resistor 1, and reads an optimum heating temperature $Th_t$ of the heat generating resistor 1 out of a look up table stored in the ROM 6. (See FIG. 11.) At the same time, the microprocessor 5 calculates the actual heating temperature Th of the heat generating resistor 1 from the terminal voltage Vh and the heating current Ih ($V_0$) of the heat generating resistor 1, as provided in equations 1 and 2 below:

$$Rh = \frac{Vh - V_0}{V_0} \times R1 \quad \text{[Equation 1]}$$

Where $V_0$ is the voltage across the reference resistor through which the heating current Ih flows, and R1 is the resistance of the resistor 2.

$$Th = \frac{1}{\alpha}\left(\frac{Rh}{R_0} - 1\right) \quad \text{[Equation 2]}$$

The quantity Th is the heating temperature of the heat generating resistor, $R_0$ is a resistance at a reference temperature (0° C. in this case) of the heating resistor, and $\alpha$ is a temperature coefficient of the heating resistor. If Th is lower than the value $Th_t$ read out of the ROM 6, a transistor 72 is driven through the D/A converter 71 to increase the current Ih flowing through the heating resistor. If Th is higher than $Th_t$, on the other hand, the heating current Ih is decreased. This procedure is repeated to keep the heat generating resistor 1 at the heating temperature $Th_t$ determined from the look up table in ROM 6. If the air flow rate Q changes in that state, the heating current Ih changes correspondingly, so that it can be used as an accurate measurement of the air flow rate. That is, an air flow rate signal $V_0$ can be obtained.

Figure 3:
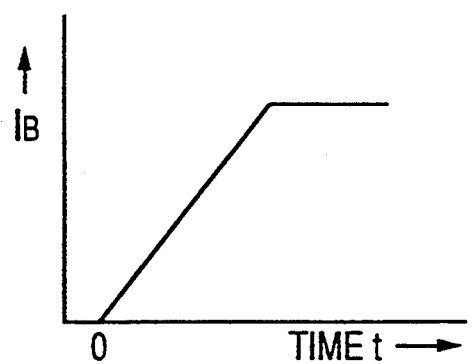
FIG. 3 is a drive current characteristic.

If the base current $I_B$ of the transistor 72 is changed abruptly (such as a step increase), it causes an overshoot as the heat generating resistor 1 inevitably has a thermal constant. In a worst case, it oscillates. To prevent the overshoot in this embodiment, the base current of the transistor 72 is made to respond to time t as shown in FIG. 3, by putting a filter in the base circuit of the transistor 72. Alternatively, data transmission from the microprocessor 5 to the D/A converter 71 may be delayed, for example, by way of an output buffer in the microprocessor 5.

Figure 4A:
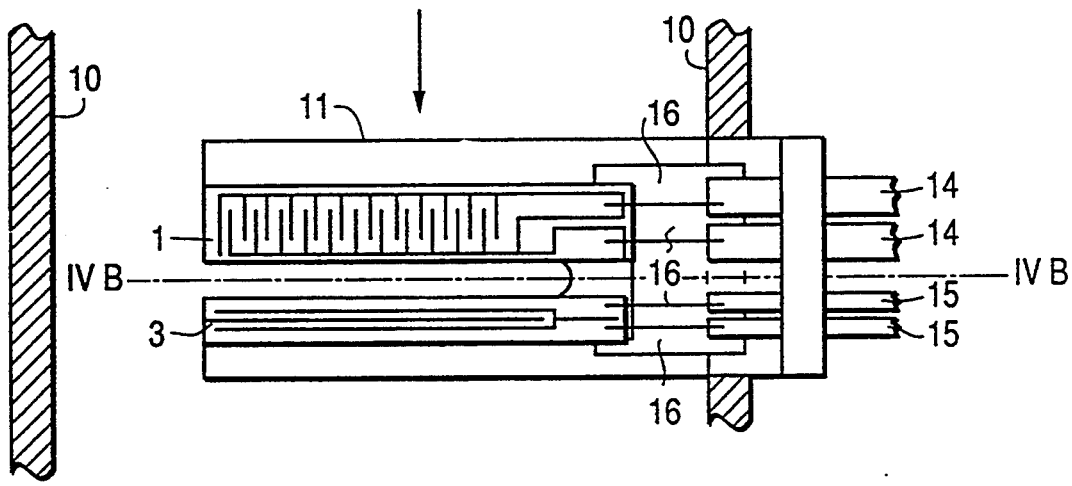
FIG. 4A shows an embodiment of the heat generating resistor and the air temperature detecting resistor.
Figure 4B:
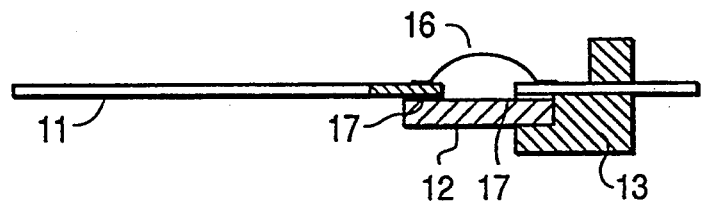
FIG. 4B is a cross sectional view of the embodiment of FIG. 4A, broken away along line IVB—IVB.
Figure 5:
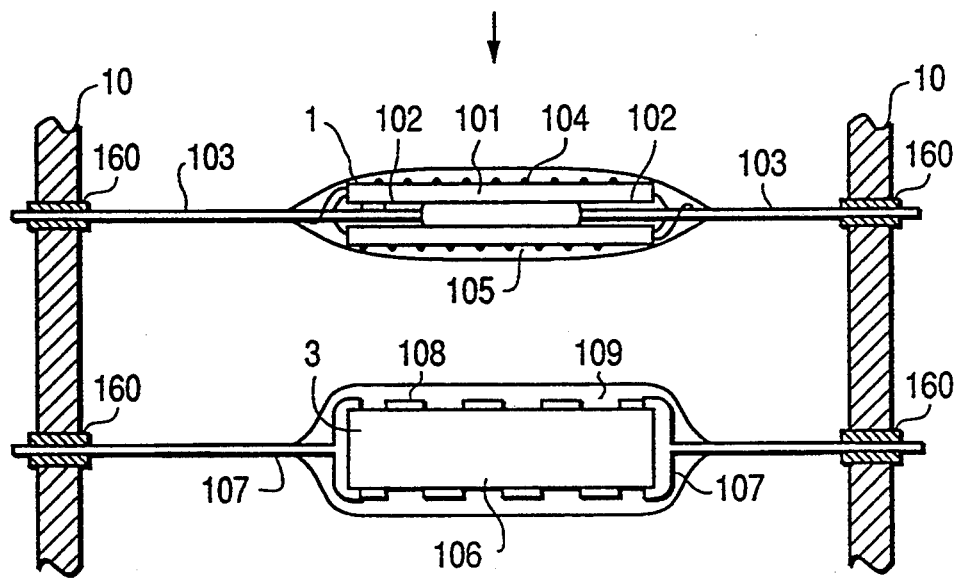
FIG. 5 shows another embodiment of the heat generating resistor and the air temperature detecting resistor.

FIGS. 4 and 5 show alternative embodiments of the heat generating resistor 1 and the air temperature detecting resistor 3. FIG. 4A shows the walls of an air flow passage 10 through which the air to be detected flows, in the direction indicated by the arrow. A base plate 11 of thin ceramic or glass plate has the heat generating resistor 1 and the air temperature detecting resistor 3 formed thereon as a thick film (by printing) or a thin film (by evaporation). The material used is platinum or similar substance of high temperature coefficient $\alpha$. In the embodiment shown in FIG. 4A, the heat generating resistor 1 and the air temperature detecting resistor 3 formed on base plate 11, are separated by a notch to prevent heat interference. (That is, to assure that the air temperature detecting resistor 3 accurately measures ambient intake air temperature, and is not affected by heat from the heat generating resistor 1.)

The base plate 11 is held on a base plate support 12 made of low heat conduction material (for example glass) with bond 17, together with a stay 13 having terminals 14 and 15 molded thereon, as shown in FIG. 4B. The stay 13 is held in the air flow passage 10. A thin wire 16 (of, for example, aluminum) electrically connects the terminals 14 and 15 with the heat generating resistor 1 and the air temperature detecting resistor 3, respectively. The terminals 14 and 15 are connected with the interface circuit 4 shown in FIG. 2.

FIG. 5 is another embodiment of a heat generating resistor 1 and an air temperature detecting resistor 3 different from those in FIG. 4. The heat generating resistor 1 in this embodiment has a ceramic (or glass) bobbin 101 and a lead 103 held in place by bond 102. The bobbin 101 is wound with a platinum wire 104 thereon, and is covered with protective coat 105. The air temperature detecting resistor 3 also has a bobbin, which in this case is evaporated with platinum on its entire surface, after which it is spirally trimmed to form a platinum resistor 108. Leads 107 are connected to the resistor 108, which is covered with protecting coat 109, as shown. Both the heat generating resistor 1 and the air temperature detecting resistor 3 are placed in the air flow path 10 through an insulator 160. The leads 107 and 103 are connected with the interface circuit 4 shown in FIG. 2.

The quantity of heat generated externally by the heat generating resistor 1 shown in FIGS. 4 and 5 is given in Equation 3 below.

$$Ih^2 Rh = (A + B\sqrt{Q})Th \quad \text{[Equation 3]}$$

Where A and B are constants of the heat generating resistor 1, and Q is the air flow rate. Thus, the output voltage $V_0$ of the air flow rate meter is given in Equations 4 and 5 below.

$$V_0 = R1 \times Ih \quad \text{[Equation 4]}$$

$$V_0 = \frac{R1}{\sqrt{Rh}} \sqrt{\{(A + B\sqrt{Q})(Th)\}} \quad \text{[Equation 5]}$$

Figure 6:
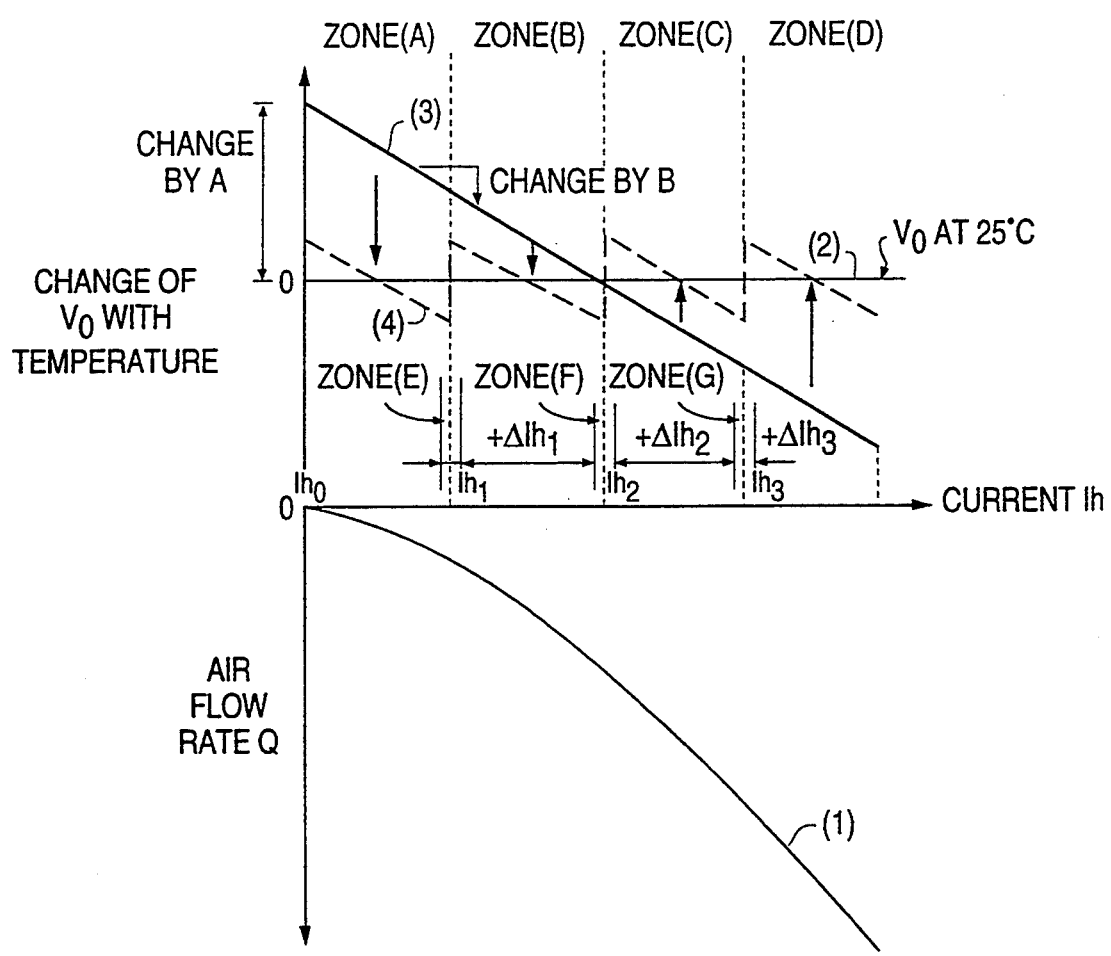
FIG. 6 shows characteristic graphs.
Figure 9:
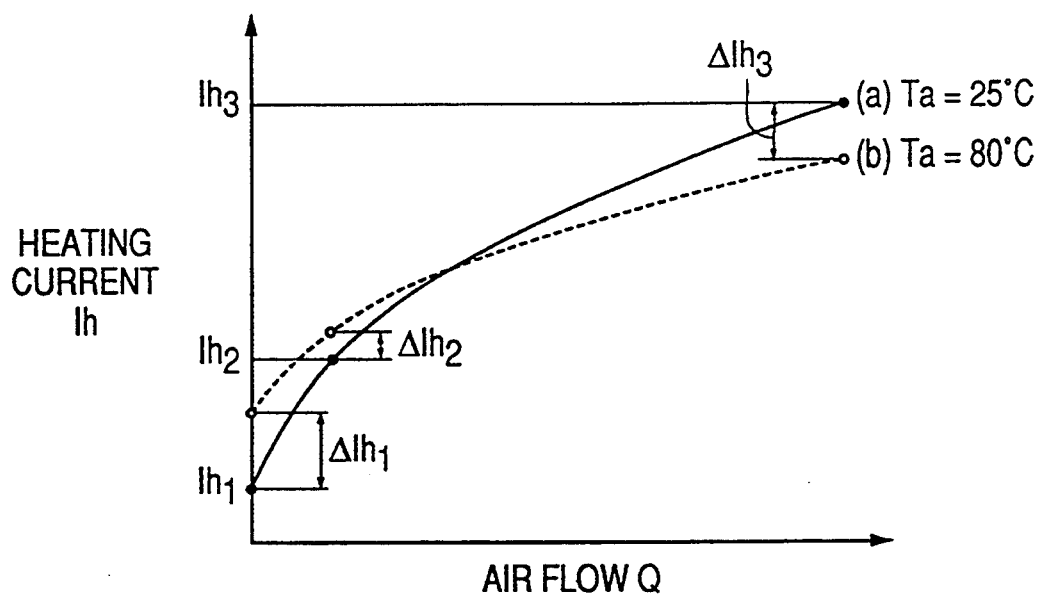
FIG. 9 illustrates Q-Ih characteristics for differing values of ambient air temperature.
Figure 10:
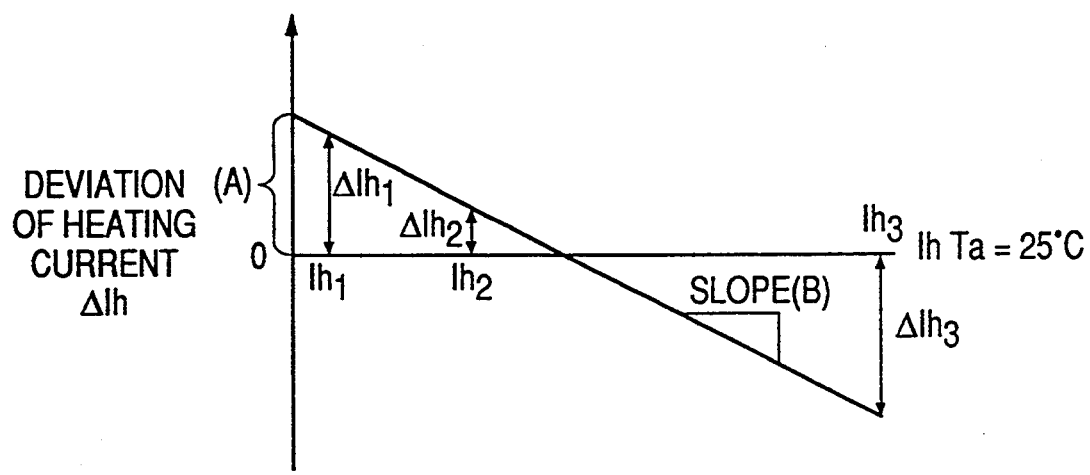
FIG. 10 shows the deviation of the heating current ΔIh, for an ambient temperature of 25°.

It can be seen from Equation 5 that the air flow rate signal $V_0$ varies with a change of either the resistance Rh or the constants A and B of the heat generating resistor 1, even if the heating temperature Th is held constant. These changes are graphed in FIG. 6, in which curve (1) shows the air flow rate Q vs. the current Ih at Ta=25° C. (Equation 3). The variance of the air flow rate signal $V_0$ due to the constants A and B is shown as a function of Ih (at a temperature of 25° C.) in curve (3), which is offset by the constant A of the heat generating resistor 1, and the sensitivity constant (slope) B at a unit air flow rate, these constants being variable with temperature. FIG. 9 shows how the Q-Ih characteristic changes with temperature. Curve (a) shows the Q-Ih relationship for Ta=25° C., and corresponds to curve (1) in FIG. 6, while curve (b) shows the same relationship for Ta=80°. The difference between the two curves results from the fact that the coefficients A and B in equation 3 vary with ambient air temperature Ta. As noted previously, the deviation of the heating current $\Delta Ih$ has a slope (B) and an offset (A) as shown in FIGS. 6 and 10.

To compensate adequately for the variation of heating current caused by ambient air temperature changes, the heating target temperature must be optimally controlled as a function of both the air temperature Ta for the constant A, and the air flow rate, or the heating current Ih, for the constant B.

The air temperature Ta and the heating current Ih in the embodiment are divided into zones (A), (B), (C) and (D). Optimum heating temperatures in the zones are stored in the ROM shown in FIGS. 1, 2 and 11. As an example, the air temperature Ta is divided every 10° C., and the heating current Ih is divided into four zones (A)–(C) as shown in FIGS. 6 and 11. If the heating temperature Th is compensated to the optimum heating temperature in every zone, then the air flow rate output variance signal $\Delta V_0$ assumes the sawtooth shape (4) shown in FIG. 6. Current compensating neutral zones (E), (F) and (G) are provided between zones (A)–(D) to prevent erroneous judgment before and after compensation, as explained in connection with FIG. 7 below.

Figure 7:
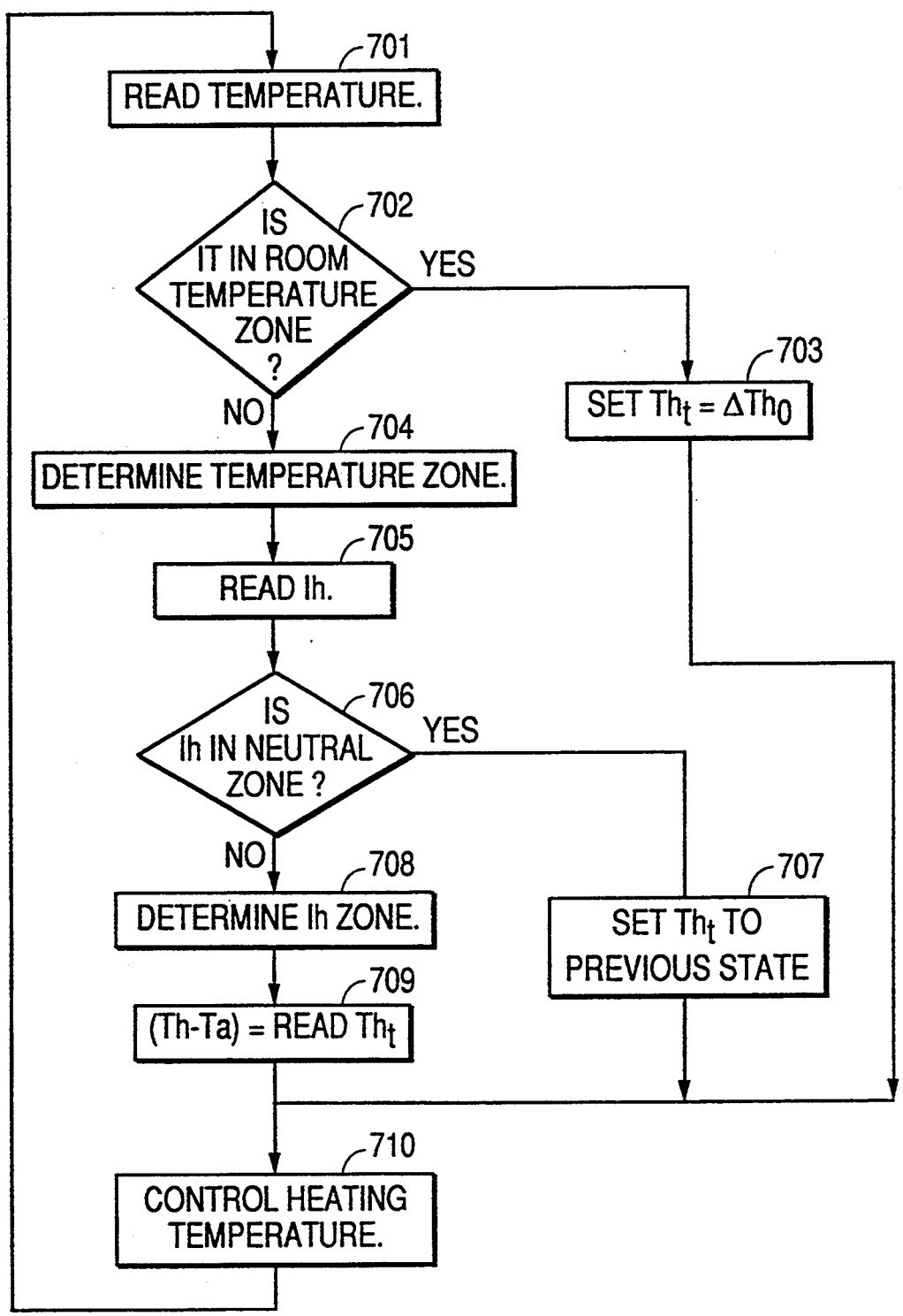
FIG. 7 is a flow chart for controlling the heating temperature of the heat generating resistor.

FIG. 7 is a flow chart for controlling the heating temperature of the heat generating resistor 1. In the figure, $\Delta Th_0$ is a reference heating temperature for room temperature, which is the same for all values of Ih. In step 701 the ambient air temperature is read, and in step 702 a determination is made whether the ambient temperature falls within the room temperature zone. If so, $Th_t$ is set to the reference value $\Delta Th_0$ in step 703, and the heating temperature Th is controlled accordingly in step 710. If the determination is made in step 702 that the ambient air temperature does not fall within the room temperature zone, a determination is made in step 704 of the temperature zone into which the ambient air temperature does fall. In step 705 Ih is read, and a determination is made in step 706 whether Ih falls within a neutral zone. If it does, then $Th_t$ is set to its previous value in step 707, and the heating temperature is controlled accordingly in step 710. If Ih does not fall in the neutral zone in step 706, then a determination is made in step 708 of the zone into which Ih falls. The quantity $Th_t$ is then read from the look up table (FIG. 11) in step 709, and the heating temperature is once again controlled accordingly in step 710. After completion of one iteration, the process returns to step 701 and is repeated.

Figure 8:
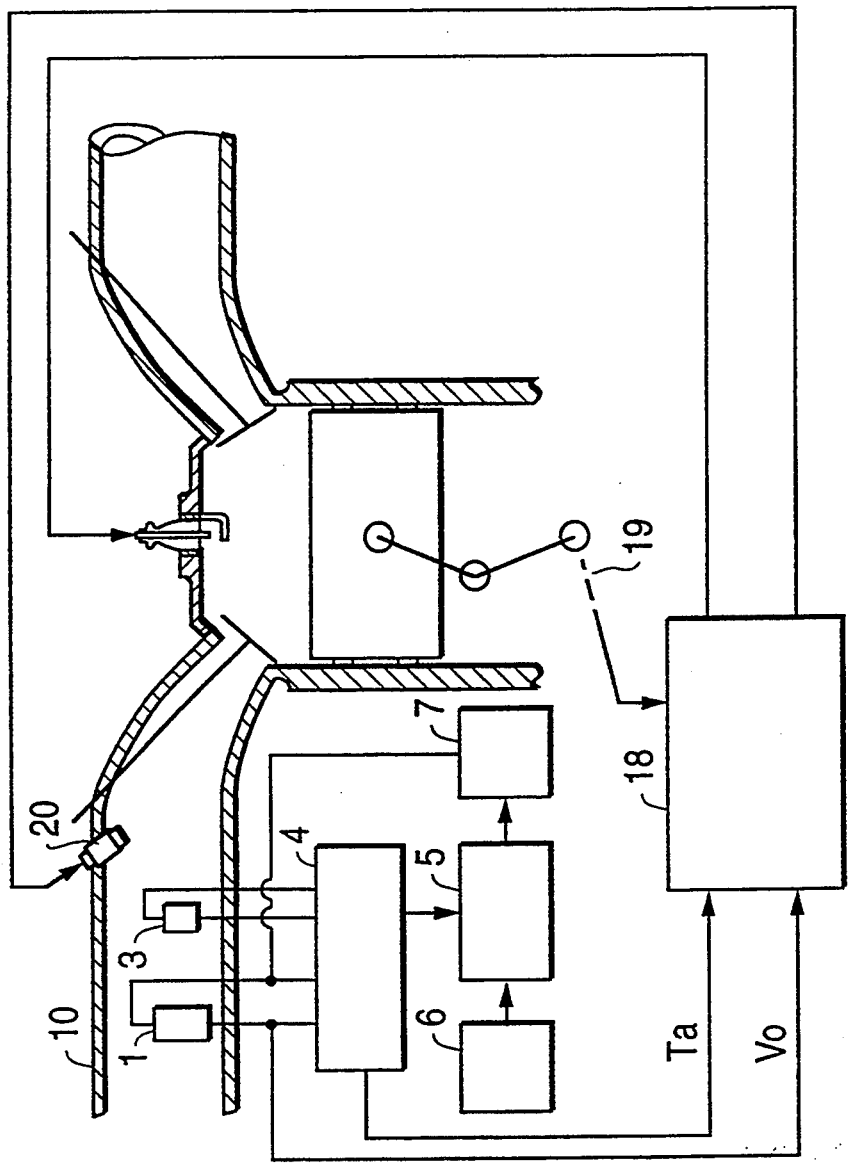
FIG. 8 is an example of the application of the air flow rate meter to a control unit for an automobile engine.

FIG. 8 shows the application of the air flow rate meter of the present invention to a control unit for an automobile engine. The heating resistor 1 and the air temperature detection resistor 3 are mounted in an air suction path 10, and the reference resistor 2 is integrated with the interface circuit 4. A control unit 18 which includes a microcomputer, receives a rotation signal 12 detected from a rotational frequency of a crank shaft of the automobile. The control unit 11 transmits an optimum fuel injection rate, calculated from the air flow rate output signal $V_0$ and the rotation signal 19, to an injector for injecting gasoline into the automobile engine via an injecting nozzle 20. At the same time, the air temperature signal Ta is entered to the control unit 11 to effect a fine control of a gasoline supply rate and the injection process.

The present invention provides an air flow rate meter having high detection accuracy over a wide temperature range. It also has a broad applicability, as the output signal obtained is the voltage output used ordinarily. The present invention allows an automobile engine to be controlled at a high accuracy that is as great as that with which the air temperature signal can be measured.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Air flow sensor comprising:
    a heat generating resistor for sensing a quantity of air flow;
    an air temperature sensor for sensing air temperature of an intake air flow;
    first means for measuring a heating current to heat said heat generating resistor to a target temperature; and
    second means for varying said target temperature in response to changes of said air temperature and said heating current.

2. Apparatus according to claim 1, wherein said means for varying comprises:
    a memory containing a look up table of optimum target temperatures; and
    means for accessing said memory based on values of said air temperature and said heating current.

3. Apparatus according to claim 1, wherein said temperature sensor is a temperature sensing resistor.

4. Air flow sensor according to claim 1, wherein said first means comprises:
    a sensor for measuring said heating current; and
    a microcomputer for controlling said heating current to maintain temperature of said heat generating resistor to said target temperature.

5. Air flow sensor according to claim 4, wherein said sensor comprises a reference resistor coupled to receive said heating current, an output voltage of said resistor being provided to said microcomputer.

6. In an air flow sensor of the type having a heat generating resistor arranged in an air intake passage, and means for detecting heating current necessary to heat said heating resistor to a target temperature:
    means for varying said target temperature in response to temperature changes of air in said intake passage, and to changes of said heating current.

7. Apparatus according to claim 6, wherein said means for varying said target temperature comprises:
    a memory containing a look up table of optimum target temperature values; and
    means for accessing said look up table based on temperature of air in said intake passage, and on magnitude of said heating current.

8. Apparatus according to claim 7, wherein said look up table is divided into a plurality of heating current zones, each heating current zone containing a value of optimum target temperature for each of a plurality of ambient air temperature ranges.

9. Application according to claim 8, wherein said look up table contains neutral zones between said heating current zones, and wherein said means for varying includes means for suppressing change of said target temperatures when said heating current is within one of said neutral zones.

10. Air flow measurement apparatus comprising:
    a heat generating resistor arranged in an air intake passage;
    a first sensor for detecting voltage across said heat generating resistor;

a second sensor for detecting heating current flowing in said heat generating resistor; and a third sensor for detecting temperature of air in said air intake passage;

output signals from said first, second and third sensors being coupled to a microprocessor which calculates temperature of said heat generating resistor based on said outputs of said first and second sensors, controls said heating current to heat said heat generating resistor to a target temperature; and calculates air flow based on magnitude of said heating current;

wherein said microprocessor varies said target value in response to values contained in a look up table, based on temperature of air in said intake passage and magnitude of said heating current.

11. Air flow measurement apparatus according to claim 10, wherein said microprocessor comprises:

a memory containing a look up table of optimum target temperature values; and means for accessing said look up table based on temperature of air in said intake passage, and on magnitude of said heating current.

12. Air flow measurement apparatus according to claim 11, wherein said look up table is divided into a plurality of heating current zones, each heating current zone containing a value of optimum target temperature for each of a plurality of ambient air temperature ranges.

13. Air flow measurement apparatus according to claim 12, wherein said look up table contains neutral zones between said heating current zones, and wherein said means for varying includes means for suppressing change of said target temperatures when said heating current is within one of said neutral zones.

14. A method of measuring an air flow in an air flow path comprising the steps of:

passing a heating current through a heat generating resistor situated in an air flow path;

measuring heating current flowing in said heating resistor;

measuring temperature of said heating resistor;

controlling said heating current so that said heat generating resistor maintains a target temperature;

measuring air temperature of air in said air flow path;

varying said target temperature in response to changes of said air temperature and said heating current; and generating an output signal indicative of a quantity of air flowing in said air flow path based on magnitude of said heating current.

15. Method according to claim 14, wherein said step of measuring temperature comprises:

measuring voltage across said heat generating resistor; and calculating temperature of said heat generating resistor based on said voltage and said heating current.

16. Method according to claim 14, wherein said varying step comprises:

reading on optimum target temperature value from a look up table stored in a memory, based on said temperature of air in said air flow path and on magnitude of said heating current.

17. Method according to claim 16, wherein said look up table is divided into a plurality of heating current zones, each heating current zone containing a value of optimum target temperature for each of a plurality of ambient air temperature ranges.

18. Method according to claim 17, wherein said look up table contains neutral zones between said heating current zones, and wherein said means for varying includes means for suppressing change of said target temperatures when said heating current is within one of said neutral zones.

19. Method according to claim 14, wherein said step of controlling said heating current comprises varying said heating current in response to change in temperature of said heating resistor.

20. Method according to claim 19, comprising the further step of delaying variation of said heating current in response to changes in said temperature of said heating resistor.

21. In an air flow sensor of the type having a heat generating resistor arranged in an air flow path and a sensor for detecting heating current to heat said heat generating resistor to a target temperature, apparatus for compensating for changes in air temperature or volume of air flow comprising:

a sensor for detecting air temperature of said air flow:

a memory containing a look up table of optimum target temperatures to compensate for said changes of air temperature or volume, based on magnitude of said heating current and on said air temperature; and means for varying said target temperature based on values contained in said look up table.

22. Apparatus according to claim 21, wherein said means for varying said target temperature comprises:

a memory containing a look up table of optimum target temperature values; and means for accessing said look up table based on temperature of air in said intake passage, and on magnitude of said heating current.

23. Apparatus according to claim 22, wherein said look up table is divided into a plurality of heating current zones, each heating current zone containing a value of optimum target temperature for each of a plurality of ambient air temperature ranges.

24. Application according to claim 23, wherein said look up table contains neutral zones between said heating current zones, and wherein said means for varying includes means for suppressing change of said target temperatures when said heating current is within one of said neutral zones.

25. Apparatus for controlling fuel injection system for a vehicle engine comprising:

means for detecting a rotational frequency of a crank shaft of said vehicle engine;

an air flow sensor of the type having a heat generating resistor arranged in an air flow path and a sensor for detecting heating current to heat said heat generating resistor to a target temperature; and a means for controlling a fuel injector of said vehicle based on said rotational frequency and on air flow detected by said air flow sensor;

wherein said air flow sensor comprises means for varying said target temperature in response to changes of ambient air temperature in said air flow path, and on changes in said heating current.

26. Apparatus according to claim 25, wherein said means for varying comprises:

a sensor for detecting air temperature of said air flow:

a memory containing a look up table of optimum target temperatures to compensate for said changes of air temperature or volume, based on magnitude of said heating current and on said air temperature; and means for varying said target temperature based on values contained in said look up table.

27. Apparatus according to claim 26, wherein said means for varying said target temperature comprises:
 a memory containing a look up table of optimum target temperature values; and
 means for accessing said look up table based on temperature of air in said intake passage, and on magnitude of said heating current.

28. Apparatus according to claim 27, wherein said look up table is divided into a plurality of heating current zones, each heating current zone containing a value of optimum target temperature for each of a plurality of ambient air temperature ranges.

29. Application according to claim 28, wherein said look up table contains neutral zones between said heating current zones, and wherein said means for varying includes means for suppressing change of said target temperatures when said heating current is within one of said neutral zones.

30. An air flow sensor comprising:
 a heat generating resistor;
 a temperature sensor for sensing air temperature of air flowing over said heat generating sensor;
 means for measuring a heating current flowing in said heat generating resistor;
 means for controlling said heating current to maintain temperature of said heat generating resistor at a target temperature; and
 means for varying said target temperature as a function of said air temperature and said heating current.

31. Air flow sensor according to claim 30, wherein said means for measuring a heating current comprises a reference resistor connected to receive said heating current, and wherein said means for controlling the heating current comprises a microcomputer which controls a switching element through which said heating current flows.

* * * * *